United States Patent [19]

Yeh

[11] Patent Number: 4,703,992

[45] Date of Patent: Nov. 3, 1987

[54] LASER BEAM CLEANUP BY PHOTOREFRACTIVE TWO-WAY MIXING

[75] Inventor: Pochi A. Yeh, Thousand Oaks, Calif.

[73] Assignee: Rockwell International Corporation, El Segundo, Calif.

[21] Appl. No.: 866,848

[22] Filed: May 27, 1986

[51] Int. Cl.$^4$ .............................................. G02F 1/03
[52] U.S. Cl. .................................. 350/3.64; 307/425; 350/358
[58] Field of Search ................ 307/425, 426, 427, 428, 307/429, 430; 332/7.5, 7.51; 372/12, 13, 21, 22; 356/352; 350/3.64, 358

[56] References Cited

U.S. PATENT DOCUMENTS

| | | | |
|---|---|---|---|
| 3,660,818 | 5/1972 | Amodei et al. | 350/3.64 |
| 3,782,802 | 1/1974 | Micheron et al. | 350/3.64 |
| 4,400,058 | 8/1983 | Durand et al. | 356/352 |
| 4,466,699 | 8/1984 | Droessler et al. | 356/352 |
| 4,492,468 | 1/1985 | Huignard et al. | 350/3.64 |
| 4,505,536 | 3/1985 | Huignard et al. | 350/3.64 |
| 4,508,964 | 4/1985 | Gunning, III et al. | 356/352 |

OTHER PUBLICATIONS

Y. R. Shen, "The Principles of Nonlinear Optics, John Wiley (New York, 1984), pp. 117–140.

Raibenbach et al., "Self–Induced Coherent Oscillations with Photorefractive $Bi_{12}SiO_{20}$ Amplifier", *Optics Letters*, vol. 10, No. 3, Mar. 1985, pp. 137–139.

Walley et al., Observation of Optical Chaos in a Phase–Conjugate Resonator, *Optics Letters*, vol. 9, p. 513 (Nov. 1984).

*Primary Examiner*—Bruce Y. Arnold
*Assistant Examiner*—Martin Lerner
*Attorney, Agent, or Firm*—H. Fredrick Hamann; Craig O. Malin; John J. Deinken

[57] ABSTRACT

An apparatus for compressing the spectral distribution of a coherent beam of light includes a narrowband filter for separating the coherent beam into a transmitted portion containing optical energy substantially limited to a single wavelength λ and a reflected portion containing the remainder of the coherent beam. A photorefractive crystal is positioned to receive the transmitted and reflected portions. A mirror deflects the reflected portion toward the photorefractive crystal. The photorefractive crystal is oriented such that two-wave mixing within the crystal causes a substantial portion of the energy in the reflected portion to be converted into optical energy at the wavelength λ and to emerge from the crystal in the direction of the transmitted portion. The spectral bandwidth of the coherent beam is less than $1/\tau$, where $\tau$ is the holographic time constant of the photorefractive element. An apparatus for converting the modes of a coherent beam of light includes a mirror containing a small orifice. The mirror separates the coherent beam into a portion transmitted through the orifice containing optical energy substantially limited to the fundamental $TEM_{00}$ mode and a portion reflected by the mirror containing the remainder of the coherent beam. A photorefractive crystal is positioned to receive the transmitted and reflected portions. A mirror deflects the reflected portion toward the photorefractive crystal. The photorefractive crystal is oriented such that two-wave mixing within the crystal causes a substantial portion of the energy in the reflected portion to be converted into optical energy with the fundamental $TEM_{00}$ mode and to emerge from the crystal in the direction of the transmitted portion.

10 Claims, 2 Drawing Figures

LASER BEAM CLEANUP BY PHOTOREFRACTIVE TWO-WAY MIXING

BACKGROUND OF THE INVENTION

This invention is concerned with techniques for improving the quality of a coherent beam of light.

An ideal laser would emit coherent radiation having a delta function spectral distribution, containing only a single frequency of light. Furthermore, the ideal laser beam would contain only the $TEM_{00}$ mode of optical resonance. A $TEM_{00}$ laser beam has a Gaussian distribution of energy which is cylindrically symmetric about the axis of propagation of the beam. Such a beam is desirable because it can be focussed onto a small area. In practice, however, a real laser emits multi-mode, quasi-monochromatic radiation which contains a finite spread in its frequency distribution. This frequency spread can be due to spontaneous emission, multilongitudinal modes of operation, and other perturbations. Depending on the quality of the laser, this finite spread can range from very small to multigigahertz quantities. Moreover, many high power lasers emit output beams which contain a number of different spatial modes. These modes cause the laser energy to spread over a relatively large area as the beam propagates.

Thus it would be desirable to provide a technique by which a less than ideal laser beam could be converted to a beam which exhibits a small bandwidth and which is limited to the $TEM_{00}$ mode of resonance.

SUMMARY OF THE INVENTION

The invention provides an apparatus for compressing the spectral distribution of a coherent beam of light, including a narrowband filter for separating the coherent beam into a transmitted portion containing optical energy substantially limited to a single wavelength $\lambda$ and a reflected portion containing the remainder of the coherent beam. A photorefractive element is positioned to receive the transmitted and reflected portions. The photorefractive element is oriented such that two-wave mixing within the element causes a substantial portion of the energy in the reflected portion to be converted into optical energy at the wavelength $\lambda$ and to emerge from the element in the direction of the transmitted portion.

The apparatus may include a mirror for deflecting the reflected portion toward the photorefractive element. The narrowband filter may be a Fabry-Perot etalon. In a more particular embodiment, the spectral bandwidth of the coherent beam is less than $1/\tau$, where $\tau$ is the holographic time constant of the photorefractive element. The photorefractive element may be a photorefractive crystal. In a more particular embodiment, the photorefractive crystal is selected from the group consisting of $LiNbO_3$, $LiTaO_3$, $SrBaNbO_3$ (SBN), $BaTiO_3$, $BiSiO_2$ (BSO), and $KNbO_3$.

The invention also includes an apparatus for converting the modes of a coherent beam of light, including a mirror containing a small orifice. The mirror separates the coherent beam into a portion transmitted through the orifice containing optical energy substantially limited to the fundamental $TEM_{00}$ mode and a portion reflected by the mirror containing the remainder of the coherent beam. A photorefractive element is positioned to receive the transmitted and reflected portions. The photorefractive element is oriented such that two-wave mixing within the element causes a substantial portion of the energy in the reflected portion to be converted into optical energy with the fundamental $TEM_{00}$ mode and to emerge from the element in the direction of the transmitted portion.

The apparatus may also include a mirror for deflecting the reflected portion toward the photorefractive element. The photorefractive element may be a photorefractive crystal. In a more particular embodiment, the photorefractive crystal is selected from the group consisting of $LiNbO_3$, $LiTaO_3$, $SrBaNbO_3$ (SBN), $BaTiO_3$, $BiSiO_2$ (BSO), and $KNbO_3$.

DESCRIPTION OF THE DRAWINGS

Additional details of the invention are described below in conjunction with the drawings, in which the same numerals are used to refer to like elements throughout all the figures. In the drawings.

DESCRIPTION OF THE INVENTION

Consider nondegenerate two-wave mixing in a photorefractive medium. Let the frequencies of the two input beams be $\omega_1$ and $\omega_2$. If the two beams cross paths in the photorefractive medium, the beams will interfere and generate an interference pattern. This interference pattern can generate an index volume grating in the medium via the redistribution of photocarriers or electrostriction. Let $\Omega = \omega_2 - \omega_1$, the frequency difference between the beams. The index grating will be a traveling wave with a frequency $\Omega$. Such a traveling wave grating will, in general, exhibit a spatial phase shift of:

$$\phi = \phi_0 + \tan^{-1}\Omega\tau \quad (1)$$

relative to the interference pattern. In photorefractive media which (operate by diffusion only, $\phi_0$ is $\pi/2$ with its sign depending on the orientation of the crystal. The parameter $\tau$ is the holographic time constant of the photorefractive medium.

As a result of the nonlocal response of the medium, asymmetric energy coupling occurs, which allows one beam to accept and the other beam to donate energy. Moreover, when the second beam is diffracted from the holographic grating, its frequency is shifted to $\omega_1$ because the index grating is a travelling wave with frequency $\Omega$. In the quantum description of this process, the following conservation of energy holds:

$$h\omega_1 = h\omega_2 - h\Omega \quad (2)$$

where h is Planck's constant. Because of the asymmetric nature of the energy exchange, photons of energy $h\omega_2$ are converted to photons of energy $h\omega_1$. In addition, the newly generated photons of energy $\omega_2$ are emitted along the direction of the first beam. The conversion efficiency $\eta$ of such a two-wave mixing process is given by:

$$\eta = (e^{\gamma L} - 1)/(e^{\gamma L} + m) \quad (3)$$

where m is the incident intensity ratio, $m = I_2(0)/I_1(0)$, and L is the interaction length. The parameter $\gamma$ is the coupling constant and is given by, for the case of $\phi_0 = \pi/2$:

$$\gamma = \gamma_0/(1+\Omega^2\tau^2) \qquad (4)$$

where $\gamma_0$ is the coupling constant for $\Omega=0$. The holographic time constant $\tau$ is the grating decay time and varies from 100 to $10^{-9}$ sec, depending on the intensity of the incident light beams and the material which is used for the photorefractive medium. Note that the coupling is insignificant when $\Omega\tau >> 1$, according to Equation 4).

Figure 1:
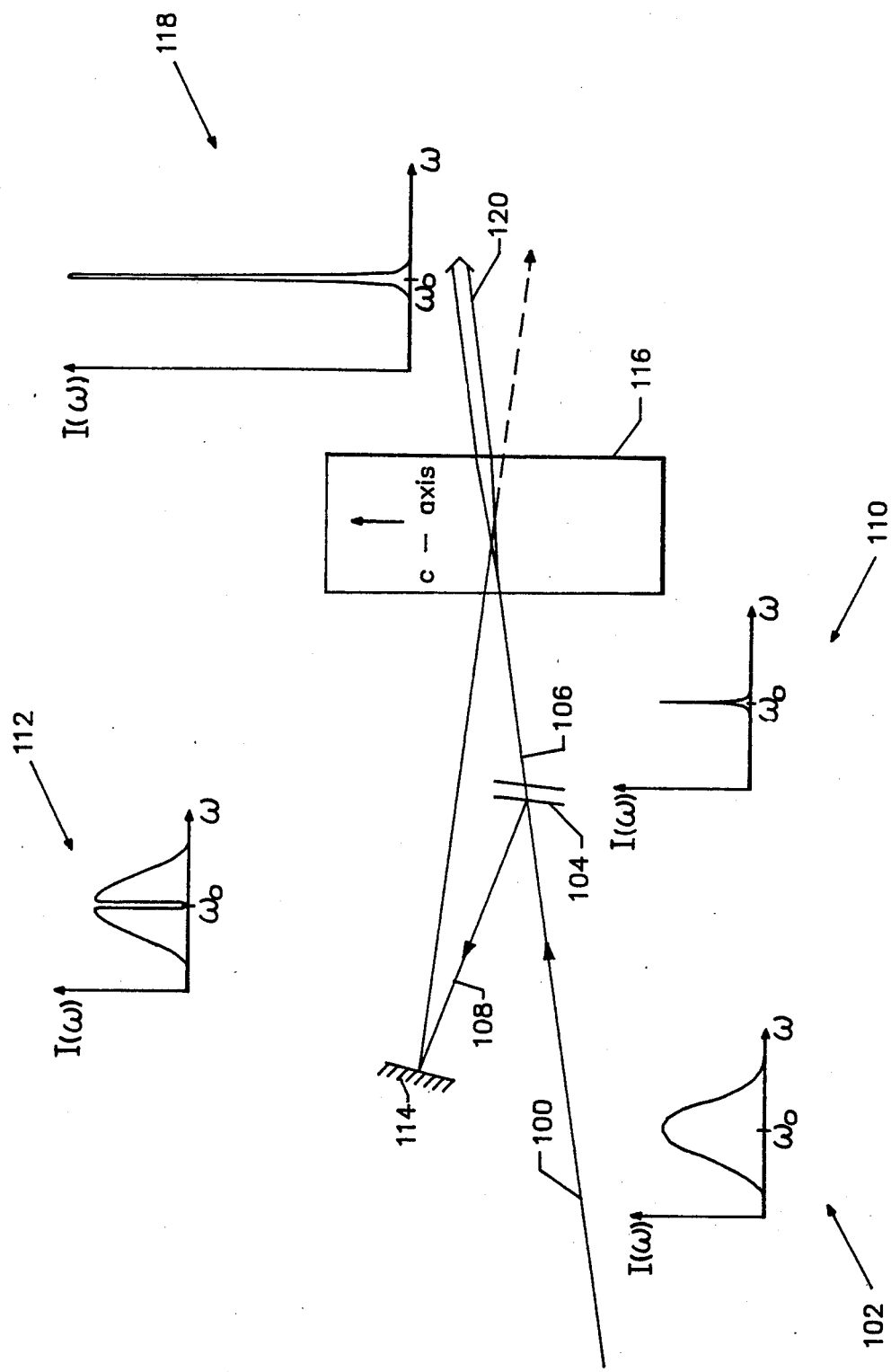
FIG. 1 is a drawing, in schematic form, illustrating one embodiment of a spectral compressor constructed according to the present invention.

It is an outstanding feature of this invention to employ the principle of four-wave mixing, as described above, to achieve spectral compression of a coherent beam. FIG. 1 is a drawing, in schematic form, illustrating one embodiment of a spectral compressor constructed according to the present invention. A quasi-monochromatic laser beam 100 exhibits the spectral distribution shown by the plot 102 of intensity I as a function of frequency $\omega$. A narrowband filter, such as the Fabry-Perot etalon 104, is employed as a spectral beam splitter, causing the beam 100 to separate into a transmitted portion 106 and a reflected portion 108. As a result of the interference which occurs in the etalon, the transmitted portion 106 is substantially limited to a single wavelength $\omega_0$, as indicated by the plot 110. Consequently, the reflected portion 108 exhibits a spectral distribution consisting of the remainder of the beam 100, as indicated by the plot 112. The reflected portion is redirected by a mirror 114, so that the transmitted and reflected portions are recombined in a photorefractive element, such as the photorefractive crystal 116. The crystal 116 can be made of such photorefractive materials as $LiNbO_3$, $LiTaO_3$, $SrBaNbO_3$ (SBN), $BaTiO_3$, $BiSiO_2$ (BSO), and $KNbO_3$. When the crystal is properly oriented with respect to the two beams, the transmitted beam 106 is amplified and gains energy from the reflected beam by means of the holographic grating which is formed within the crystal. The spectral bandwidth $\Delta\omega$ of the beam is assumed to be less than $1/\tau$, where $\tau$ is the holographic time constant of the photorefractive crystal. As a result, much of the energy in the reflected beam is converted to the transmitted beam with a narrower spectral distribution, as indicated by the plot 118 which indicates the spectral distribution of the amplified output beam 120. The spectral bandwidth of the output beam in this case is the same as the bandwidth of the Fabry-Perot etalon 104. The energy of the output beam will be somewhat less that that of the input beam due to the finite amount of energy which is deposited in the crystal in forming the grating.

Figure 2:
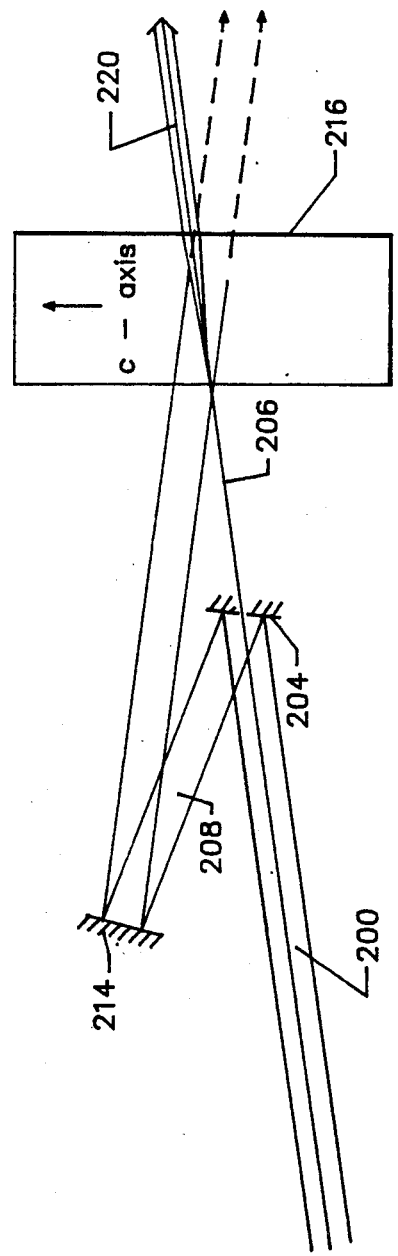
FIG. 2 is a schematic illustration of another embodiment of the invention which converts higher order modes into the fundamental mode of energy.

Another problem encountered with coherent beams is the presence of multiple modes of optical energy in such a beam. FIG. 2 is a schematic illustration of another embodiment of this invention which converts higher order modes into the fundamental mode of energy.

A multimode laser beam 200 impinges on a mirror 204, which has a pinhole 220 in it. The portion 206 of the incident beam which is transmitted through the pinhole is substantially limited to the fundamental $TEM_{00}$ mode of optical energy, while the remainder 208 of the incident beam is reflected from the mirror 204. The reflected portion is redirected by a mirror 214, so that the transmitted and reflected portions are recombined in a photorefractive crystal 216. When the c-axis of the crystal is properly oriented with respect to the two beams, the transmitted beam 206 is amplified and gains energy from the reflected beam by means of the holographic grating which is formed within the crystal. Because of the multi-spatial modes, the reflected beam 208 may be considered as a superposition of many plane wave components. Each of these plane wave components will interact with the transmitted beam and donate its energy to the output beam 220. As a result, much of the energy in the reflected beam is coupled to the transmitted beam. Such a process converts higher order modes into the fundamental mode with a high conversion efficiency.

Those skilled in the art will undoubtedly find additional embodiments and modifications apparent. The Fabry-Perot etalon, for example, could be replaced by other types of narrowband filters. Consequently, the exemplary embodiments should be considered as illustrative, rather than inclusive, and the appended claims are intended to define the full scope of the invention.

I claim:

1. An apparatus for compressing the spectral distribution of a coherent beam of light, comprising:
    a narrowband filter for separating the coherent beam into a transmitted portion containing optical energy substantially limited to a single wavelength $\lambda$ and a reflected portion containing the remainder of the coherent beam;
    a photorefractive element positioned to receive the transmitted and reflected portions and oriented such that two-wave mixing within the element causes a substantial portion of the energy in the reflected portion to be converted into optical energy at the wavelength $\lambda$ and to emerge from the element in the direction of the transmitted portion.

2. The apparatus of claim 1, further comprising a mirror for deflecting the reflected portion toward the photorefractive element.

3. The apparatus of claim 1, wherein the narrowband filter further comprises a Fabry-Perot etalon.

4. The apparatus of claim 1, wherein the spectral bandwidth of the coherent beam is less than $1/\tau$, where $\tau$ is the holographic time constant of the photorefractive element.

5. The apparatus of claim 1, wherein the photorefractive element further comprises a photorefractive crystal.

6. The apparatus of claim 5, wherein the photorefractive crystal is selected from the group consisting of $LiNbO_3$, $LiTaO_3$, $SrBaNbO_3$ (SBN), $BaTiO_3$, $BiSiO_2$ (BSO), and $KNbO_3$.

7. An apparatus for converting the modes of a coherent beam of light, comprising:
    a mirror containing a small orifice for separating the coherent beam into a portion transmitted through the orifice containing optical energy substantially limited to the fundamental $TEM_{00}$ mode and a portion reflected by the mirror containing the remainder of the coherent beam;
    a photorefractive element positioned to receive the transmitted and reflected portions and oriented such that two-wave mixing within the element causes a substantial portion of the energy in the reflected portion to be converted into optical energy with the fundamental $TEM_{00}$ mode and to emerge from the element in the direction of the transmitted portion.

8. The apparatus of claim 7, further comprising a mirror for deflecting the reflected portion toward the photorefractive element.

9. The apparatus of claim 7, wherein the photorefractive element further comprises a photorefractive crystal.

10. The apparatus of claim 9, wherein the photorefractive crystal is selected from the group consisting of $LiNbO_3$, $LiTaO_3$, $SrBaNbO_3$ (SBN), $BaTiO_3$, $BiSiO_2$ (BSO), and $KNbO_3$.

* * * * *